(12) United States Patent
Svoldgaard et al.

(10) Patent No.: US 10,555,540 B2
(45) Date of Patent: Feb. 11, 2020

(54) FISH DECAPITATING APPARATUS AND A METHOD FOR DECAPITATING FISH

(71) Applicant: MAREL SALMON A/S, Stovring (DK)

(72) Inventors: Peter Thisted Svoldgaard, Stovring (DK); Mads Aagaard Dahl, Bronderslev (DK)

(73) Assignee: MAREL SALMON A/S, Stovring (DK)

( * ) Notice: Subject to any disclaimer, the term of this patent is extended or adjusted under 35 U.S.C. 154(b) by 0 days.

(21) Appl. No.: 16/336,035

(22) PCT Filed: Sep. 26, 2017

(86) PCT No.: PCT/EP2017/074344
§ 371 (c)(1),
(2) Date: Mar. 22, 2019

(87) PCT Pub. No.: WO2018/055198
PCT Pub. Date: Mar. 29, 2018

(65) Prior Publication Data
US 2019/0274321 A1 Sep. 12, 2019

(30) Foreign Application Priority Data
Sep. 26, 2016 (EP) .................................... 16190643

(51) Int. Cl.
*A22C 25/00* (2006.01)
*A22C 25/14* (2006.01)
(Continued)

(52) U.S. Cl.
CPC ............ *A22C 25/142* (2013.01); *A22C 25/08* (2013.01); *B65G 17/12* (2013.01); *B65G 2201/0202* (2013.01)

(58) Field of Classification Search
CPC ....... A22C 25/00; A22C 25/02; A22C 25/025; A22C 25/08; A22C 25/14; A22C 25/17; A22C 25/145; A22C 25/18
(Continued)

(56) References Cited

U.S. PATENT DOCUMENTS

| 3,680,174 A | 8/1972 | Dohrendorf |
| 4,037,294 A * | 7/1977 | Cowie ................... A22C 25/16 452/136 |

(Continued)

FOREIGN PATENT DOCUMENTS

| EP | 1018891 A1 | 7/2000 |
| EP | 2174551 A1 | 4/2010 |
| WO | 2015121512 A1 | 8/2015 |

OTHER PUBLICATIONS

International Search Report and Written Opinion from PCT Application No. PCT/EP2017/074344, dated Dec. 22, 2017.

*Primary Examiner* — Richard T Price, Jr.
(74) *Attorney, Agent, or Firm* — Workman Nydegger (57) ABSTRACT

A fish decapitating apparatus includes a fish holder configured to receive a fish with the belly side facing up at an in-feed station, a cutting station and a conveying apparatus configured to convey the fish in the fish holder from the in-feed station to the cutting station. The fish holder includes opposingly arranged guide members moveable in a hinge like manner. The guide members are configured to clamp the fish behind the collar bones such that the collar bones rest on an outer side of the guide members in the clamped state with the fish head sticking out from the fish holder. The fish decapitating apparatus includes a measuring device configured to measure the position of the collar bones when in the clamped position, and a control unit configured to automati-
(Continued)

cally adjust the position of the cutting station during cutting in accordance with the measured position of the collar bones.

16 Claims, 7 Drawing Sheets

(51) Int. Cl.
 *A22C 25/08* (2006.01)
 *B65G 17/12* (2006.01)
(58) Field of Classification Search
 USPC .................................. 452/149–164, 166–171
 See application file for complete search history.

(56) References Cited

U.S. PATENT DOCUMENTS

| | | | | |
|---|---|---|---|---|
| 4,599,765 | A * | 7/1986 | Kristinsson | A22C 25/142 |
| | | | | 452/170 |
| 6,361,426 | B1 * | 3/2002 | Kragh | A22C 25/08 |
| | | | | 452/157 |
| 7,056,202 | B2 * | 6/2006 | Pein | A22C 25/145 |
| | | | | 452/161 |
| 8,118,647 | B2 * | 2/2012 | Mikajiri | A22C 25/14 |
| | | | | 452/149 |

* cited by examiner

FISH DECAPITATING APPARATUS AND A METHOD FOR DECAPITATING FISH

FIELD OF THE INVENTION

The present invention relates to a fish decapitating apparatus and a method for decapitating fish.

BACKGROUND OF THE INVENTION

SUMMARY OF THE INVENTION

On the above background it is an object of embodiments of the present invention to provide a high yield fish decapitating apparatus that is capable of fully automatically adapting the decapitating process to the different fish sizes, shapes, widths etc.

In general, the invention preferably seeks to mitigate, alleviate or eliminate one or more of the above mentioned disadvantages of the prior art singly or in any combination. In particular, it may be seen as an object of embodiments of the present invention to provide a system that solves the above mentioned problems, or other problems.

To better address one or more of these concerns, in a first aspect of the invention a fish decapitating apparatus is provided, comprising:
a fish holder configured to receive a fish at an in-feed station,
at least one cutting station,
a conveying apparatus configured to convey the fish in said fish holder, from the in-feed station, to said at least one cutting station,
wherein the fish holder comprises opposingly arranged guide members moveable in a hinge like manner in relation to each other, said guide members being configured to clamp the fish head behind the collar bones such that the collar bones are resting on an outer side of said guide members from which the fish head sticks out from the fish holder, the fish decapitating apparatus further comprising:
a measuring unit configured to measure the position of the collar bones when said collar bones are resting on the outer side of said guide members, and
a control unit configured to, in accordance with said measured position of the collar bones, automatically adjust the position of said at least one cutting station.

The collar bones give an accurate reference point for a subsequent decapitation of the fish, which typically is a salmon, and therefore it is now possible to fully automatically and accurately decapitate the fish with high yield using said at least one cutting station. Moreover, the apparatus is flexible since it is possible to decapitate a larger range of sizes and/or shapes of fishes.

The term "outer side of said guide members" is accordingly to be understood as the side facing away from the remaining part of the fish holder.

In one embodiment, said fish holder is positioned such that a longitudinal axis of the fish in said fish holder is substantially perpendicular to a conveying direction of said conveying apparatus. This makes the apparatus less spacious and the throughput may be increased.

In one embodiment, said conveying apparatus comprises a carousel conveyor comprising an endless chain or belt to which a plurality of said fish holders are attached, and where the conveying direction is a closed loop path around a horizontal rotation axis, and where said conveying is performed in discrete steps, where at said at least one cutting station, during cutting, said plurality of fish holders are temporarily stationary. Preferably, the discrete steps are performed such that an operator can place the fish into the carrier while it is temporarily stopped. More importantly, the one or more cuts performed at the at least one cutting station will be more accurate compared to if the cut would be formed while the fish is being conveyed, which reduces the complexity of the at least one cutting station. The term discrete steps may in one embodiment be understood as a step where the conveyor is stationary for e.g. one or a few seconds, but this may depend on the time an operator needs to place a new fish into such a fish carrier. This time would also preferably be selected based on the time said at least one cutting station needs to complete the cut. Moreover, due to the fact that the conveying apparatus has a carousel like structure, the overall apparatus becomes more compact.

In one embodiment, said at least one cutting station comprises a pair of circular cutting blades arranged in V-shape, in the following referred to as V-shaped arranged circular cutting blades. The V-shape arrangement of said pair of circular cutting blades being adapted to the outer shape of said guide members when being in said clamped position, where said pair of V-shaped arranged circular cutting blades are mounted to a moving mechanism configured to move the pair of V-shaped arranged circular cutting blades in a horizontal direction, and along an axis being parallel to said outer shape of said guide members when being in said clamped position, said automatic adjustment of the position being an initial horizontal position such that the subsequent cut performed by said V-shaped arranged circular cutting blades is between said guide members and said collar bones. This cutting station may also be referred as a decapitating (or de-heading) cutting station where the fish head is removed. Accordingly, it is thus possible to accurately perform a cut that is positioned accurately between the collar bones and said outer shape of said guide members and in that way minimize the amount of fish meat that remains on the fish head, and thus maximize the overall yield of the de-heading. In a preferred embodiment, shortly before the cut with said pair of V-shaped arranged circular cutting blades is completed, the moving mechanism moves the V-shaped arranged circular cutting blades horizontally in an opposite direction towards the initial horizontal position. This results in a partly curved cut which facilitates the removal of the fish head and increases the yield of the cut.

In one embodiment, said guide members are spring loaded such that a rest position of the spring load pushes said guide members towards each other. In that way, it is ensured that said guide members, via the spring force, automatically clamps the fish head behind the collar bones in a user friendly manner. The fish holder is preferably designed such that when an operator places the fish into the fish holder, the guide members "open" via the spring load while the operator presses the fish head therethrough, and subsequently automatically closes via the spring load leaving the collar bones resting on the outer surface of said guide members. Said spring load may e.g. comprise a regular spring that is mechanically connected to both said guide members in such a way that the guide members, as already mentioned, are automatically pulled towards each other.

In one embodiment, said guide members are arranged such that when being in said clamped position said guide members are in a linear extended position compared to when being in an open position, said linear extended position causing a pulling force between the fish head sticking out from the fish holder and the remaining part of the fish in the fish holder. Accordingly, in said clamped position the fish holder is in a more extended position compared to when being in an open position meaning that a pulling force is exerted on said fish head which facilitates the subsequent cutting step(s). The guide members may be arranged on a guide allowing them to slideably move between said extended and clamped positions.

In one embodiment, said measuring unit is configured to measure the distance between said guide members and said measured position of the collar bones is determined based on said distance between said guide members. Accordingly, a simple way is provided to measure the position of the collar bones. The apparatus may, as an example, be calibrated such that the width of the opening of the guide members corresponds to a certain linear position, i.e. by measuring the width, at least the horizontal position of the collar bones is known. Referring to the embodiment of above, the control unit knows exactly where to position the V-shaped arranged circular cutting prior to performing the actual cutting.

The term "position of the collar bones" may also be understood, and the distance between the collar bones, or the position of the collar may be utilized, to determine the distance between the collar bones.

In one embodiment, said apparatus further comprises a back bone cutting station arranged below said fish holder upstream in relation to said V-shaped arranged circular cutting blades, said back bone cutting station being configured to cut through the back bone of the fish. By cutting through the back bone first facilitates the subsequent cut by said V-shaped arranged circular cutting blades and it will be ensured that after the subsequent V-cut that the head of the fish will fall off.

In one embodiment, said cut performed by said V-shaped arranged circular cutting blades is performed after 180 degrees rotation of the fish holder in said carousel conveyor. Cutting the fish with said V-shaped arranged circular cutting blades after this 180 degrees rotation may facilitate the cutting process. By preferably performing the back bone cut first, this facilitates the accuracy of the cutting and therefore the yield of the processing, where said V-shaped arranged circular cutting blades preferably move horizontally first in accordance with said position of the collar bones, preferably followed by a subsequent movement from up to down along said axis following the outer shape of said guide member when being in said clamped position.

In one embodiment, the apparatus further comprises elongated and opposingly arranged structures configured to clamp around the fish head shortly before the cutting by said V-shaped arranged circular cutting blades so as to maintain it stationary during the cutting.

In one embodiment, the apparatus further comprises a further measuring unit configured to measure the shoulder position of the remaining part of the fish.

In one embodiment, said at least one cutting station further comprises at least one cutting tool configured to perform a shoulder cut on the fish subsequent to said V-shaped cut performed by said V-shaped arranged circular cutting blades, in accordance with said measured shoulder positioning. All eventually remaining bone parts may thus be removed. It should be noted that the cut performed by said V-shaped arranged circular cutting blades is typically a straight cut meaning that some remaining part of the collar bones and/or other bone types may still be present. Thus, said at least one cutting tool ensures that these remaining bones are removed. Based on the above, it is thus ensured that the yield is maximised. Said at least one cutting tool comprises, in one embodiment, further V-shaped arranged circular cutting blades, typically having a diameter being smaller that the diameter of said V-shaped arranged circular cutting blades, where the diameter is adapted to the shoulder part such that it fits optimally.

In one embodiment, the apparatus further comprises an outfeed station configured to remove the remaining part of the fish from the fish holder via e.g. appropriate guide members that may be designed such that they interact with the fish holder in a way that the remaining part of the fish is automatically removed onto e.g. a take-away conveyor that conveys it from the apparatus.

In one embodiment, said back bone cutting station, said station containing said V-shaped arranged circular cutting blades, and said at least one cutting tool configured to perform a shoulder cut on the fish subsequent to said V-shaped cut performed by said V-shaped arranged circular cutting blades, and preferably said outfeed station are preferably arranged, e.g. in the mentioned order, in a downstream direction in relation to the conveying directing, e.g. in said carousel conveyor.

In one embodiment, said fish holder further comprises posterior located and opposingly arranged hold members configured to provide a support to the remaining part of the fish. In an embodiment, said posterior located and opposingly arranged hold members are spring loaded in a direction towards each other. Accordingly, a very stabile fish holder is provided where it is ensured that the fish is fully supported at all times. Said posterior located and opposingly arranged hold members may in one embodiment comprise plurality of spikes or spike like members, e.g. of few millimetres length, that are arranged on inner sides of said at least one of said hold members. The spikes are preferably design such they engage partly into the sides of the fish and thus provide a further support during said cutting steps.

In a second aspect of the invention, a method is provided for decapitating a fish, comprising:
placing a fish into a fish holder at an in-feed station,
conveying the fish in said fish holder, from the in-feed station, to said at least one cutting station where at least one subsequent cutting step is performed,
wherein the fish holder comprises opposingly arranged guide members moveable in a hinge like manner in relation to each other, said step of placing the fish into said fish holder being performed such that the guide members clamp the fish head behind the collar bones such that the collar bones are resting on an outer side of said guide members from which the fish head sticks out from the fish holder, the method further comprising:
measuring the position of the collar bones when said collar bones are resting on the outer side of said guide members, and
utilizing said measured position as input parameter when performing said at least one subsequent cutting step.

Accordingly, a method is provided for decapitating a fish in a full automatic manner where the yield of the processing is maximized due to the highly accurate cutting in accordance with the positioning of the collar bones. The fish is preferably placed into the fish holder with the belly facing up.

In one embodiment, said step of conveying said fish holder is such that a longitudinal axis of the fish is substantially perpendicular to a conveying direction of said conveying apparatus, and where said conveying is performed along a closed loop around a horizontal rotation axis. In that way, the processing method is made very compact and effective.

In one embodiment, the method further comprises a step of performing a back bone cutting through the back bone of the fish prior to conveying the fish in said fish holder to said at least one cutting station.

In one embodiment, said at least one subsequent cutting step comprises the following cutting steps:

performing a V-cutting with a pair of V-shaped arranged circular cutting blades arranged with the obtuse angle facing the fish head, where the angular adjustment of said pair of V-shaped arranged circular cutting blades is substantially the same as an outer shape of said guide members when being in said clamped position, said step of utilizing said measured position as input parameter being a step of adjusting an initial horizontal position of said pair of V-shaped arranged circular cutting blades such that the subsequent cut performed by said V-shaped arranged circular cutting blades is between said guide members and said collar bones, and performing a shoulder cut after said V-cutting step has been performed using at least one cutting blade.

In general the various aspects of the invention may be combined and coupled in different ways within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
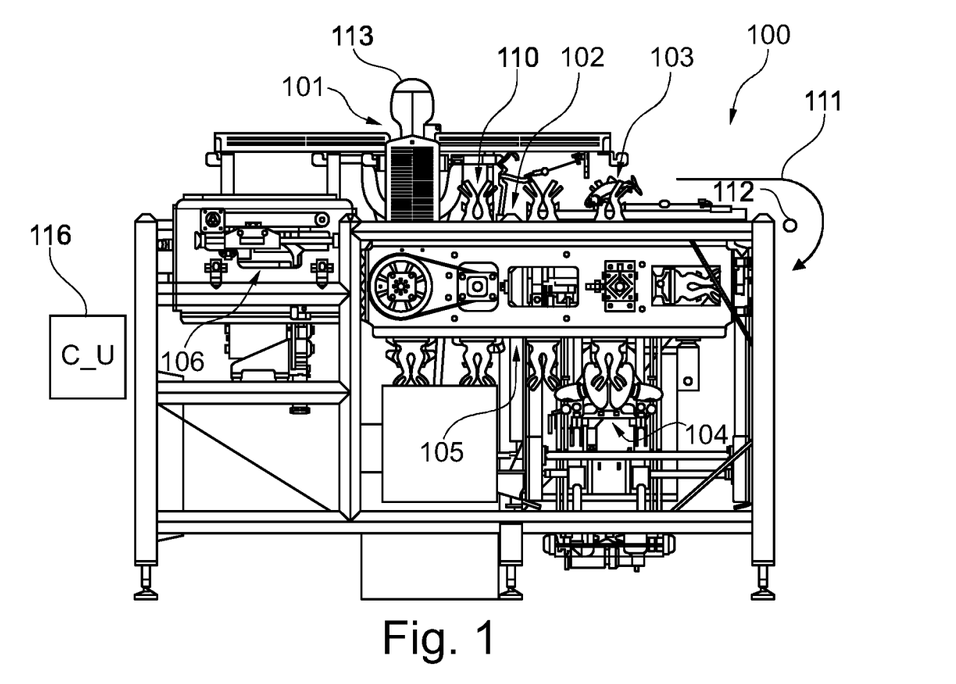
FIG. 1 depicts a front overview view and FIGS. 2 and 3 perspective overview of one embodiment of a fish decapitating apparatus according to the present invention.
Figure 2:
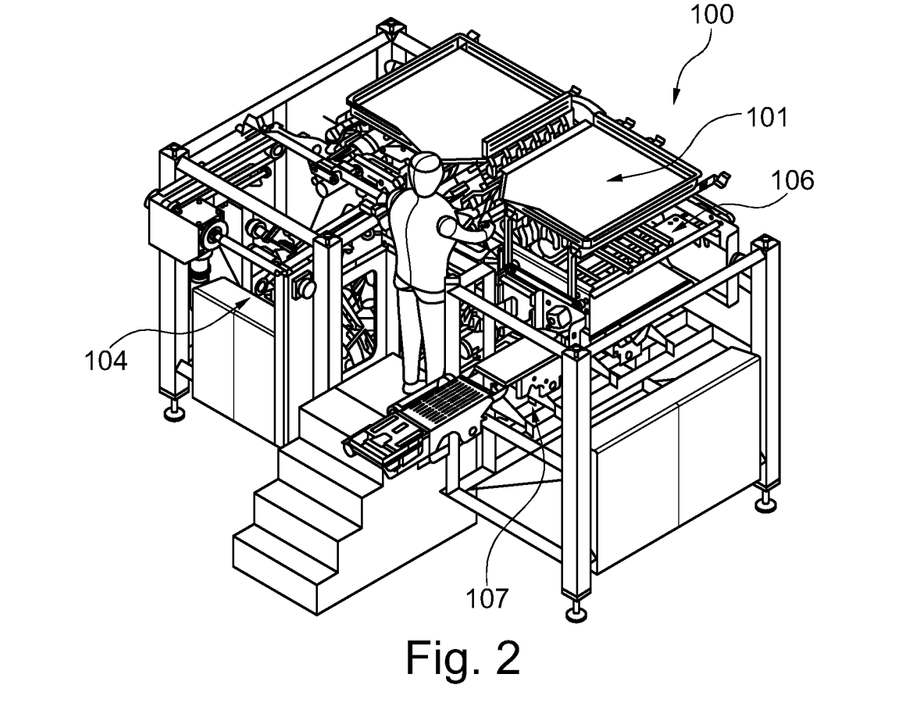
Figure 3:
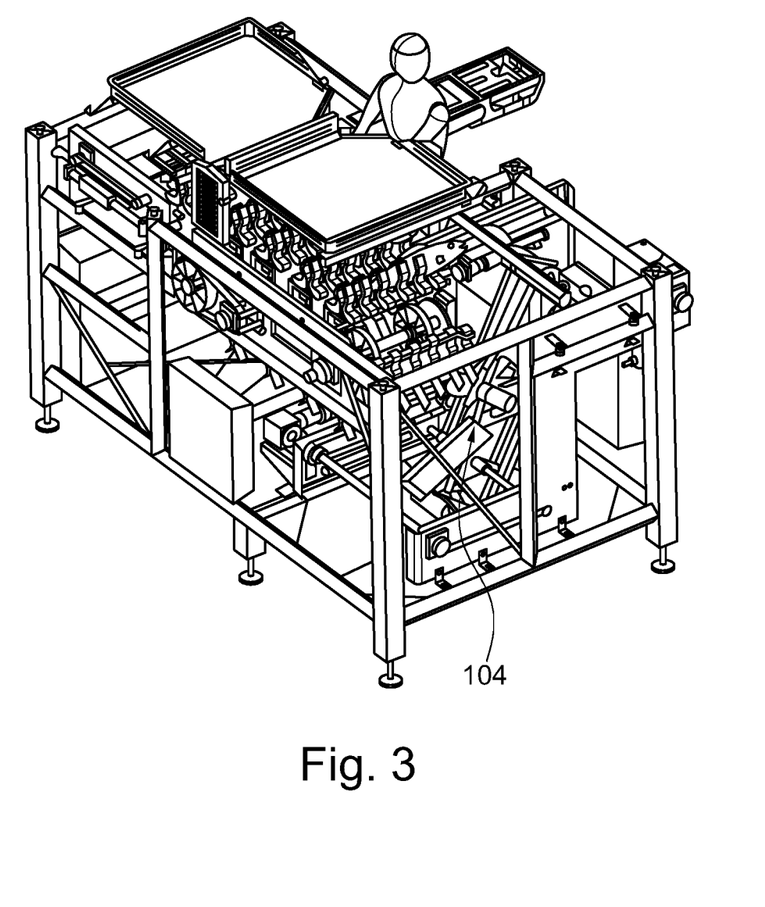

FIG. 1 depicts a front overview and FIGS. 2 and 3 illustrate perspective overviews of one embodiment of a fish decapitating apparatus 100 according to the present invention, for decapitating a fish, typically a salmon. In the embodiment shown here, the fish decapitating apparatus 100 comprises a plurality of a fish holders 110, a conveying apparatus and a plurality of cutting stations 103-105.

The conveyor apparatus shown here comprises a carousel conveyor comprising an endless chain or belt to which a plurality of said fish holders 110 are attached and conveyed in a conveying direction as indicated by the arrow 111 along a closed loop path around a horizontal rotation axis 112. As will be shown in more details later, each of the fish carriers 110 shown here is configured to receive a fish, preferably with the belly side facing up.

The fish holder comprises opposingly arranged guide members (not shown here) moveable in a hinge like manner, e.g. via a spring load, in relation to each other such that when the fish is placed therein the guide members clamp the fish head behind the collar bones such that the collar bones are resting on an outer side of said guide members in said clamped state with the fish head sticking out from the fish holder.

As shown here, an operator 113 is positioned at the infeed area 101 where he receives a fish (a fish is shown at the cutting station 103) and places it into the fish holder. This may e.g. be done by means of pushing the fish into the fish older such that it is correctly guided into the holder until the collar bones rest on an outer side of the guide members, which at this point are in a clamped position.

The conveying of the fish holders 110 is preferably performed in discrete steps such that said fish holders are temporarily stationary during cutting. The duration may e.g. be a second or a few seconds, which also allows the operator to place the fish into the fish holder while it is stationary, and to do the cutting steps at the different cutting stations.

The apparatus further comprises a measuring unit 102 configured to measure the position of the collar bones when being in said clamped position in the fish holder, and a control unit 116 is configured to automatically adjust the position of said at least one cutting station during cutting in accordance with said measured position of the collar bones. The measuring may be performed using e.g. any type of camera, X-ray technique, etc., or by determining the width of the opening of the opposingly arranged guide members.

As will be discussed later, after placing the fish into said fish holder and after or prior to measuring said position of the collar bones, it is preferred that a back bone cut is performed at a back bone cutting station 103 using e.g. a cutting blade positioned downstream to the infeed area using a suitable cutting blade or the like.

Said at least one cutting station comprises a decapitating cutting station 104 where the fish head is removed, with a pair of V-shaped arranged circular cutting blades arranged relative to each other such that they follow an outer shape of said guide members when being in said clamped position. Said step of utilizing said measured position of the collar bones as input parameter comprises adjusting an initial horizontal position of said pair of V-shaped arranged circular cutting blades such that the subsequent cut performed by said V-shaped arranged circular cutting blades is between said guide members and said collar bones. As shown here, said decapitating cutting station 104 is located at a lower side of the carousel conveyor such that the V-cut is performed when the fish shoulder has turned 180 degrees, with the back facing up. The cut is, in this embodiment, performed by moving the V-shaped arranged circular cutting blades from an upper position towards a lower position along an axis extending along an outer surface of the guide member, where it is ensured that the resulting linear cut is between the guide members and the collar bones. The cutting process may end with a horizontal withdrawal of the V-shaped arranged circular cutting blades causing a curved cut at the belly side of the fish. In that way, the fish head removal yield is facilitated.

A shoulder cutting station 105 is shown for performing a subsequent shoulder cut using e.g. similar V-shaped circular cutting blades for removing all remaining bones from the shoulder part of the fish.

Figure 4:
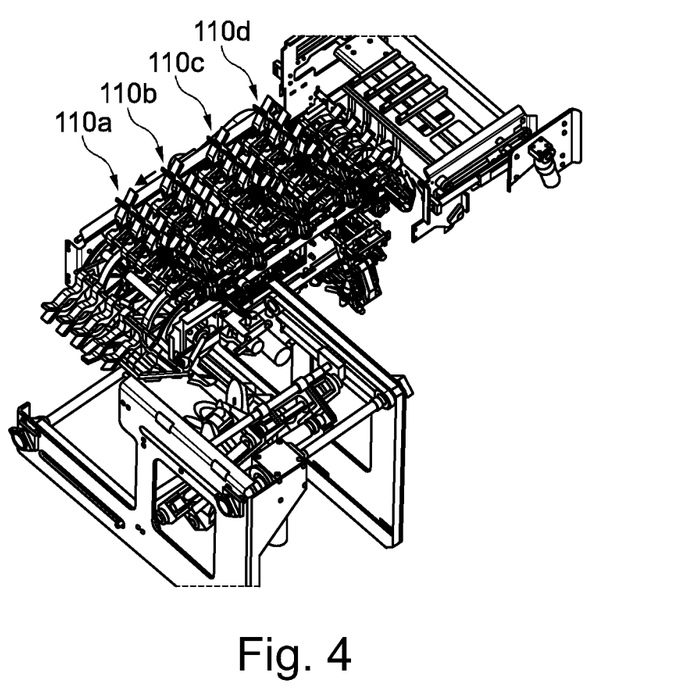
FIGS. 4 and 5 show a another overview of the apparatus discussed in realtion to FIGS. 1 to 3, in the absence of some of the outer part, e.g. in the input area, the frame structure etc.
Figure 5:
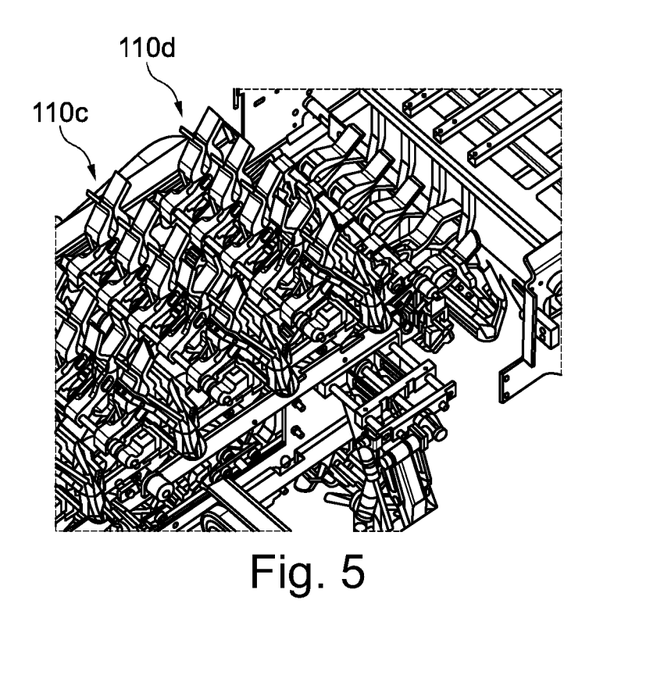

FIGS. 4 and 5 show another overview of the apparatus discussed in relation to FIGS. 1 to 3, in the absence of some of the outer part, e.g. in the input area, the frame structure etc., showing in further details said plurality of fish holders 110a-d arranged on said carousel conveyor that moves the fish holders along said closed loop path.

Figure 6:
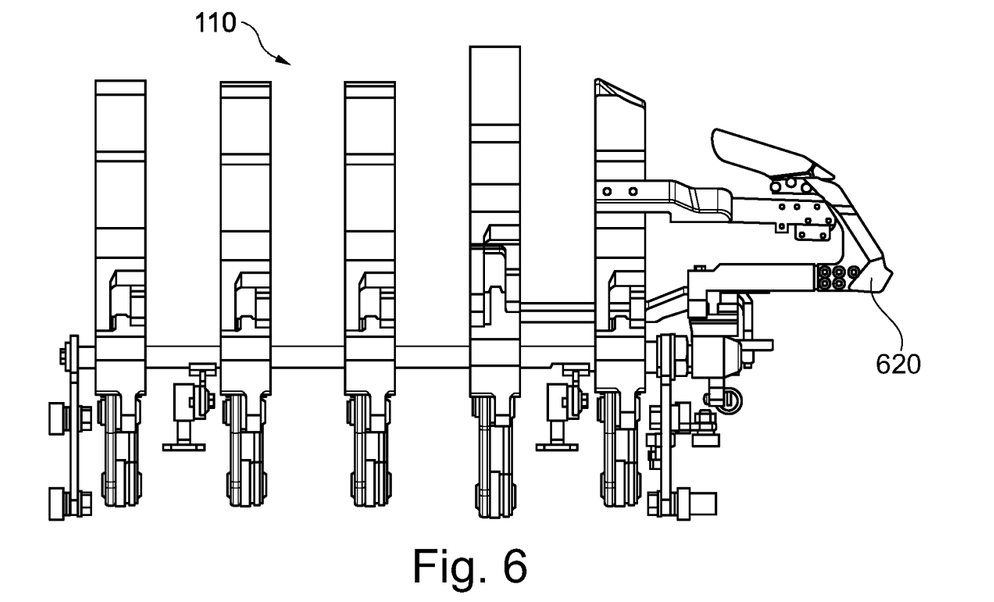
FIGS. 6 to 8 depict one embodiment of a fish holder for use in a decapitating apparatus, e.g. the one shown in FIGS. 1 to 5, where the fish holder is designed to receive a whole fish with the belly side facing up.
Figure 7:
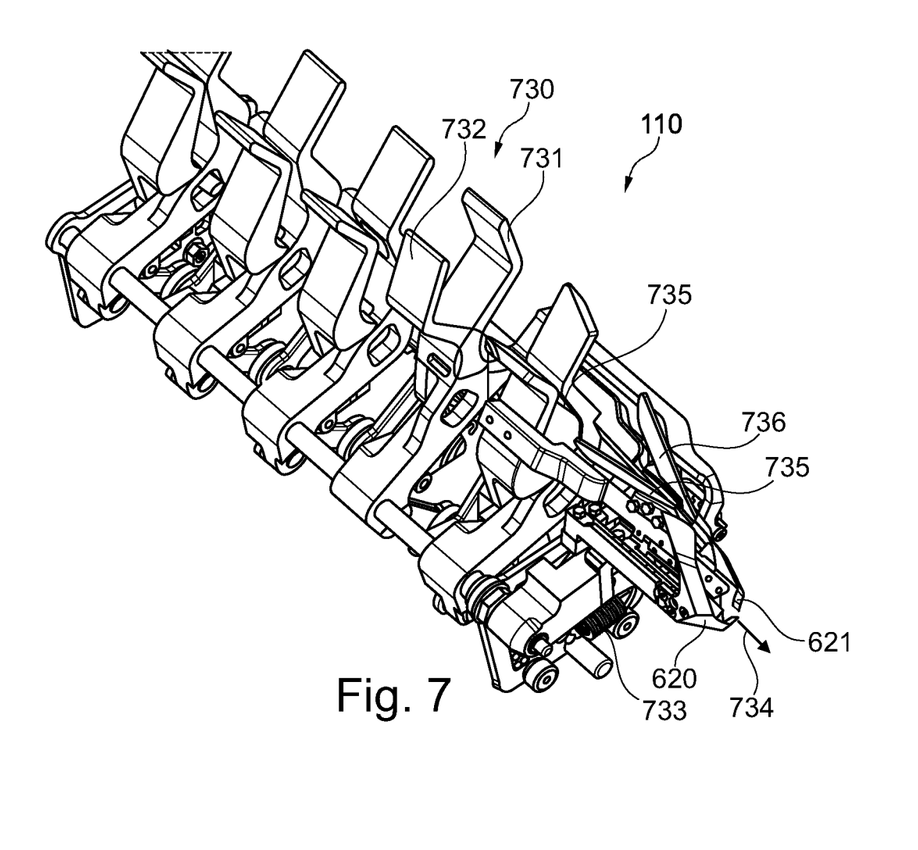
Figure 8:
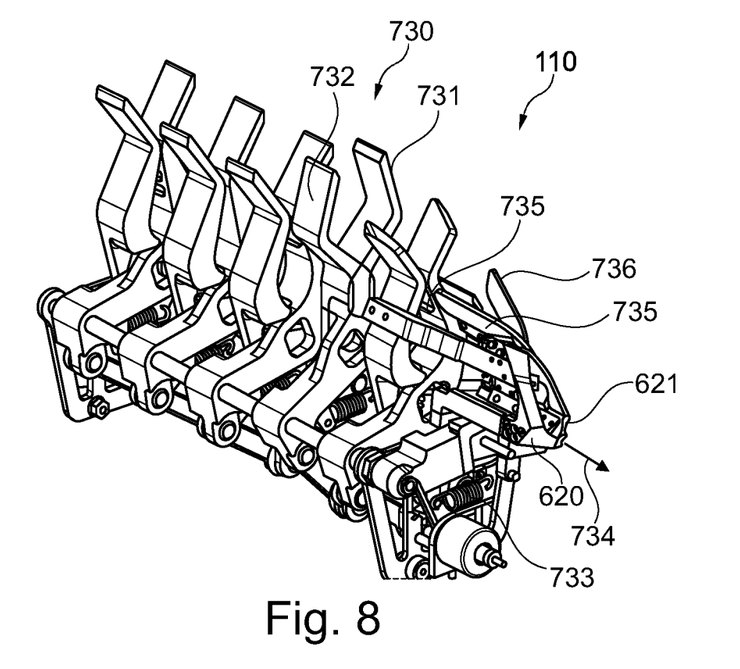

FIGS. 6 to 8 depict one embodiment of a fish holder according to the present invention to be used in relation to a decapitating apparatus, e.g. the one shown in FIGS. 1 to 5. The fish holder is designed to receive a whole fish with the belly side facing up and comprises opposing guide members 620, 621 moveable in a hinge like manner, e.g. via a spring 733, in relation to each other such that when a fish (not shown) is placed therein the guide members clamp the fish head behind the collar bones such that the collar bones (not shown) are resting on an outer side of said guide members in said clamped state with the fish head sticking out from the fish holder in a direction shown by the arrow 734. The fish holder 110 shown here comprises a rear part 730 comprising a plurality of opposingly arranged hold members 731, 732 configured to provide a support to the remaining part of the fish, where said opposingly arranged hold members 731, 732 may be spring loaded in a direction towards each other so as to clamp the fish there between. In an embodiment, to ensure a further fixation of the fish, some or all the hold members comprise spikes extending outwards from an inner side of one or more of said hold members configured to ensure that the fish does not slide in a horizontal direction. Additional guides 735, 736 having e.g. a wing-like shape so as to facilitate the process of placing the fish into the fish holder such that it becomes guided to said position where the collar bones are resting on an outer side of said opposingly arranged guide members 620, 621.

Figure 9:
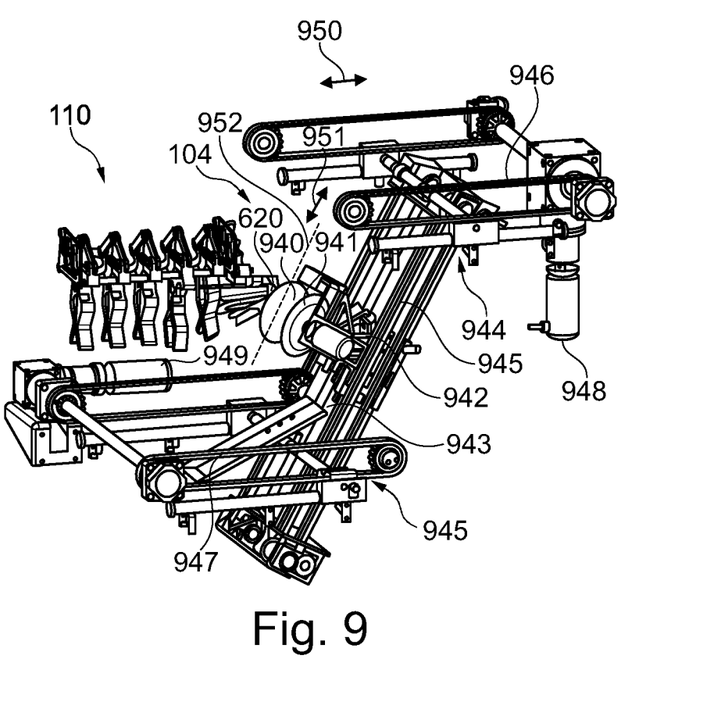
FIG. 9 shows one embodiment of a decapitating cutting station discussed in relation to FIGS. 1 to 3.
Figure 11:
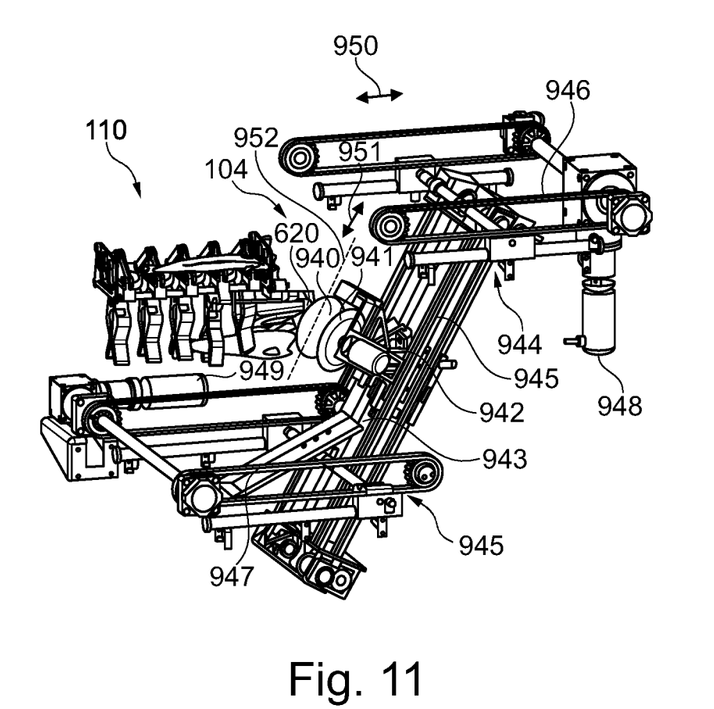
FIG. 11 illustrates the apparatus in FIG. 9 and a fish.

FIG. 9 shows one embodiment of a decapitating cutting station 104 discussed in relation to FIGS. 1 to 3, comprising V-shaped cutting blades 940, 941 where the wide opening of the "V" faces the fish head. As already discussed, this cutting station is arranged at a turning side of the carousel conveyor, i.e. after the fish holder has turned 180 degrees, where the fish is preferably positioned with the back side facing up during cutting. This should however not be considered as necessary, but for simplicity it is assumed that the fish guide has turned 180 degrees. FIG. 11 illustrates the same embodiment and a fish being turned.

The V-shaped cutting blades 940, 941 are in this embodiment mounted to a structure 942 attached to a frame 943, where the frame extends between an upper 944 and lower 945 conveyor device. The conveyor devices 944, 945 are configured to advance the frame 943 and thus said blades 940, 941 in a linear horizontal direction indicated by arrow 950. The conveyor devices shown here comprise endless belts 946, 947 and motors 948. Other conveying solutions are of course also possible that are well known to a person skilled in the art, e.g. by using a single conveyor setup to provide said one dimensional advancement of the frame.

The structure 942 is also slideably attached to a rail 945 or similar means, configured to advance the structure 942 and thus the blades 940, 941 in an upward/downward direction along the frame 943. The angular position of the frame 943 is substantially parallel to an axis 952, and to an outer shape of the fish holder when the fish holder is rotated 180 degrees. In this way, the blades can slide very close to the fish holder and perform a cut which is very precisely located relative to the location of the fish.

As already discussed, before this V-cut is performed, it is preferred that a back bone cut has been performed. The position shown here is where the fish holder 110 with fish (not shown) is in a cutting position. The cutting process is, as already addressed, performed when the fish holder 110 is temporarily stationary. The operation of this decapitating cutting station 104 may be described in the following way: The fish holder is advanced in the position shown here, where it is positioned opposite to the decapitating cutting station 104. During this, or simultaneously, or shortly subsequently, the frame 943 and thus said V-shaped cutting blades 940, 941 are advanced horizontally via said conveyor devices 944, 945 to a starting position, which is preferably above the fish holder. This operation is operated by e.g. said control unit 116 in accordance with said position of the collar bones. This initial starting position ensures that the subsequent cut performed by advancing the frame 943 and thus said V-shaped cutting blades 940, 941 downwards and along the axis 952 such that the cut is between said guide member 620, 621 and the collar bones. Shortly before the actual head removal, the controlling may further comprise linear horizontal back movement of the V-shaped cutting blades away from the fish, which results in a head removal.

The fish carrier is subsequently advance to a next cutting station, which may be referred to as a shoulder cutting station 105, e.g. the one discussed previously in relation to FIGS. 1 to 3.

Figure 10:
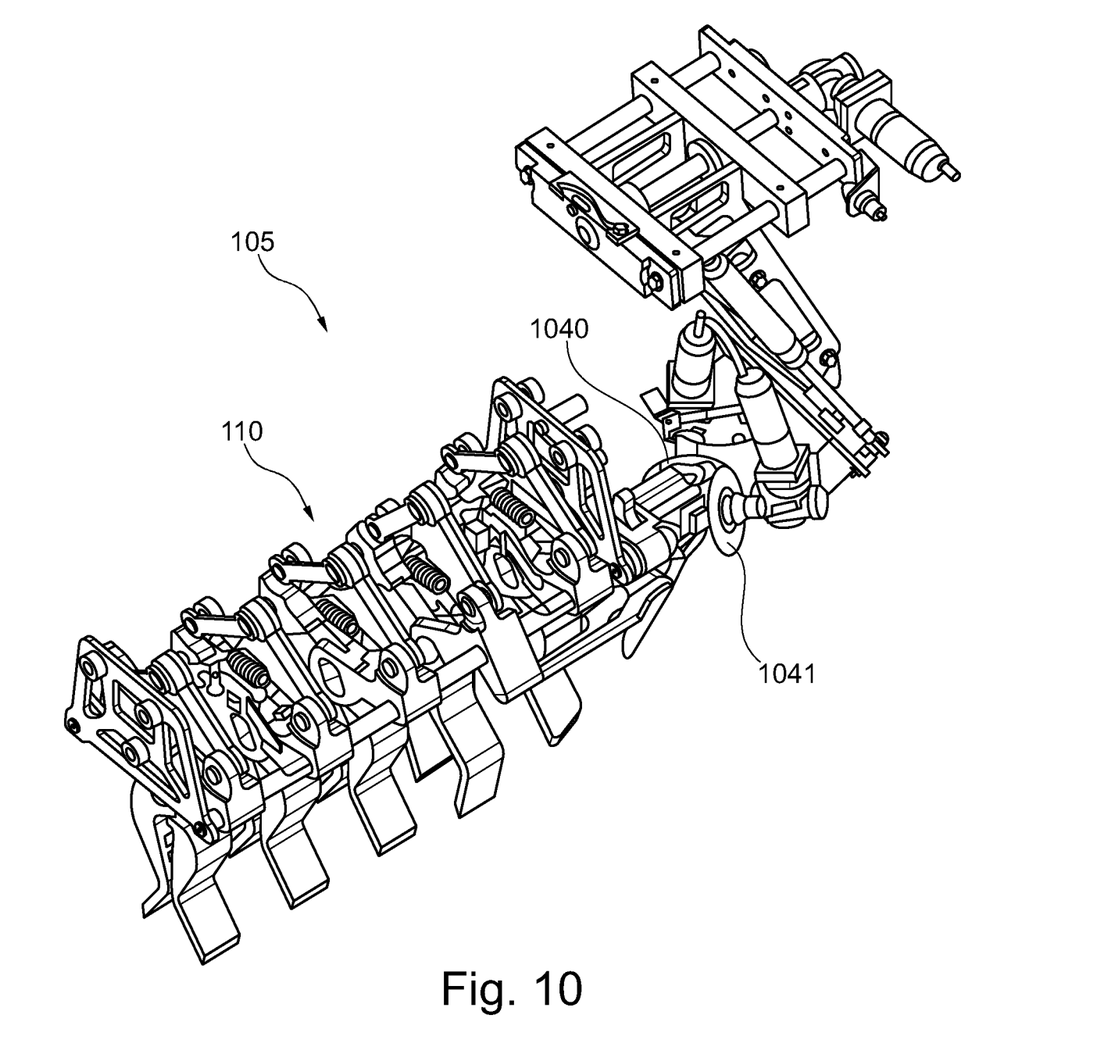
FIG. 10 shows one embodiment of a shoulder cutting station.

FIG. 10 illustrates one embodiment of a shoulder cutting station. In one embodiment, a further measuring unit may be provided to measure the position of the fish again, e.g. the shoulder, in case it has e.g. somewhat changed after said decapitating cutting station 104. The fact that the V-shaped cutting blades move linearly, there may be some remaining bones at the shoulder part of the fish, which may be cut away at the shoulder cut station 105. As shown here, the shoulder cut station 105 may comprise further circular V-shaped blades 1040, 1041, having preferably smaller diameter than those at said decapitating cutting station 104, and preferably being aligned to the shape of the cut at the decapitating cutting station 104, so as to allow removing the remaining bones. The operation of these further circular V-shaped blades 1040, 1041 may be similar to what was discussed in relation to FIG. 9, where the measuring data from the further measuring unit may be utilized as input data in adjusting the initial horizontal position of the further circular V-shaped blades 1040, 1041, followed by a subsequent downwards movement of the further circular V-shaped blades 1040, 1041.

While the invention has been illustrated and described in details in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A fish decapitating apparatus, comprising:
  a fish holder configured to receive a fish at an in-feed station;
  at least one cutting station;
  a conveying apparatus configured to convey the fish in said fish holder, from the in-feed station, to said at least one cutting station;
  wherein the fish holder comprises opposingly arranged guide members moveable in a hinge like manner in relation to each other;

said guide members being configured to clamp the fish head behind the collar bones such that the collar bones are resting on an outer side of said guide members from which the fish head sticks out from the fish holder, the fish decapitating apparatus further comprising:

a measuring unit configured to measure the position of the collar bones when said collar bones are resting on the outer side of said guide members; and a control unit configured to, in accordance with said measured position of the collar bones, automatically adjust the position of said at least one cutting station.

2. The fish decapitating apparatus according to claim 1, wherein said fish holder is positioned such that a longitudinal axis of the fish in said fish holder is substantially perpendicular to a conveying direction of said conveying apparatus.

3. The fish decapitating apparatus according to claim 1, wherein said conveying apparatus comprises a carousel conveyor comprising an endless chain or belt to which a plurality of said fish holders are attached; and where the conveying direction is a closed loop path around a horizontal rotation axis; and where said conveying is performed in discrete steps, where at said at least one cutting station, during cutting, said plurality of fish holders are temporarily stationary.

4. The fish decapitating apparatus according to claim 3, wherein said cut performed by said V-shaped arranged circular cutting blades is performed after 180 degrees rotation of the fish holder in said carousel conveyor.

5. The fish decapitating apparatus according to claim 1, wherein said at least one cutting station comprises a pair of V-shaped arranged circular cutting blades;

the arrangement of said pair of V-shaped arranged circular cutting blades being adapted to the outer shape of said guide members when being in said clamped position;

where said pair of V-shaped arranged circular cutting blades are mounted to a moving mechanism configured to move the pair of V-shaped arranged circular cutting blades in a horizontal direction, and along an axis being parallel to said outer shape of said guide members when being in said clamped position, said automatic adjustment of the position being an initial horizontal position such that the subsequent cut performed by said V-shaped arranged circular cutting blades is between said guide members and said collar bones.

6. The fish decapitating apparatus according to claim 5, further comprising a further measuring unit configured to measure the shoulder positioning of the remaining part of the fish.

7. The fish decapitating apparatus according to claim 6, further comprising at least one cutting tool configured to perform a shoulder cut on the fish subsequent to said V-shaped cut performed by said V-shaped arranged circular cutting blades, in accordance with said measured shoulder positioning.

8. The fish decapitating apparatus according to claim 1, wherein said guide members are spring loaded such that a rest position of the spring load pushes said guide members towards each other.

9. The fish decapitating apparatus according to claim 1, wherein said guide members are arranged such that when being in said clamped position said guide members are in a linear extended position compared to when being in an open position, said linear extended position causing a pulling force between the fish head sticking out from the fish holder and the remaining part of the fish in the fish holder.

10. The fish decapitating apparatus according to claim 1, wherein said measuring unit is configured to measure the distance between said guide members and where said measured position of the collar bones is determined based on said distance between said guide members.

11. The fish decapitating apparatus according to claim 1, wherein said fish holder further comprises a posterior located and opposingly arranged hold members configured to provide a support to the remaining part of the fish.

12. The fish decapitating apparatus according to claim 11, wherein said posterior located and opposingly arranged hold members are spring loaded in a direction towards each other.

13. A method for decapitating a fish, comprising:
placing a fish into a fish holder at an in-feed station;
conveying the fish in said fish holder, from the in-feed station, to said at least one cutting station where at least one subsequent cutting step is performed;
wherein the fish holder comprises opposingly arranged guide members moveable in a hinge like manner in relation to each other;
said step of placing the fish into said fish holder being performed such that the guide members clamp the fish head behind the collar bones such that the collar bones are resting on an outer side of said guide members from which the fish head sticks out from the fish holder, the method further comprising:
measuring the position of the collar bones when said collar bones are resting on the outer side of said guide members; and
utilizing said measured position as input parameter when performing said at least one subsequent cutting step.

14. The method according to claim 13, wherein said step of conveying fish holder is said fish holder is such that a longitudinal axis of the fish is substantially perpendicular to a conveying direction of said conveying apparatus, and where said conveying is performed along a closed loop around a horizontal rotation axis.

15. The method according to claim 13, further comprising a step of performing a back bone cutting through the back bone of the fish prior to conveying the fish in said fish holder to said at least one cutting station.

16. The method according to claim 13, said at least one subsequent cutting step comprises:
performing a V-cutting with a pair of V-shaped arranged circular cutting blades, the internal shape of the V-shaped arranged circular cutting blades being such that it is line with the outer shape of said guide members when being in said clamped position;
said step of utilizing said measured position as input parameter comprising adjusting an initial horizontal position of said pair of V-shaped arranged circular cutting blades such that the subsequent cut performed by said V-shaped arranged circular cutting blades is between said guide members and said collar bones; and
performing a shoulder cut after said V-cutting step has been performed using a further pair of V-shaped arranged circular cutting blades.

* * * * *